United States Patent
Frank

[15] 3,703,676
[45] Nov. 21, 1972

[54] INVERTER

[72] Inventor: Kjell Frank, Vasteras, Sweden

[73] Assignee: Allmanna Svenska Elektriska Aktiebolaget, Vasteras, Sweden

[22] Filed: May 7, 1971

[21] Appl. No.: 141,177

[30] Foreign Application Priority Data

May 15, 1970 Sweden ................6688/70
Dec. 16, 1970 Sweden ..............17026/70

[52] U.S. Cl. .................................321/5, 321/45 C
[51] Int. Cl. ...........................................H02m 7/48
[58] Field of Search ................321/5, 45 R, 45 C

[56] References Cited

UNITED STATES PATENTS

| | | |
|---|---|---|
| 3,354,370 | 11/1967 | Corry et al. ..............321/45 C |
| 3,331,011 | 7/1967 | Landis ....................321/45 C |
| 3,340,457 | 9/1967 | Schmitz ..................321/45 C |
| 3,384,804 | 5/1968 | Salihi ......................321/45 C |
| 3,487,278 | 12/1969 | Turnbull et al. .........321/45 C |

*Primary Examiner*—William M. Shoop, Jr.
*Attorney*—Jennings Bailey, Jr.

[57] ABSTRACT

An inverter has a connection group arranged to be fed with DC voltage and which includes two controlled main rectifiers in series with each other connected to the DC source and a connection point between which forms the output terminal for the output voltage of the inverter. These rectifiers are fired alternately. Two controlled commutating rectifiers in series are arranged to be supplied with DC voltage and are fired alternately in order to extinguish the main rectifiers. A commutating capacitor and a reactance are connected in series between the connection point of the main rectifiers and a point between the commutating rectifiers. An inductive element is connected with the capacitor to form an oscillating circuit so as to recharge the capacitor at each commutation. A series connection including the commutating rectifiers is supplied with positive and negative DC voltage of higher and lower potential respectively than that of the positive and negative poles of the first DC source. A limiting rectifier having such polarity that it is made reverse blocking by the voltage of the first DC source is connected between each pole of the first DC source and the terminal of the commutating capacitor facing the AC output.

2 Claims, 4 Drawing Figures

INVENTOR.
KJELL FRANK

INVENTOR.
KJELL FRANK
BY Jennings Bailey

INVERTER

BACKGROUND OF THE INVENTION

1. Field of the Invention

The invention relates to an inverter of the type having a connection group arranged to be fed with DC voltage and which includes two controlled main rectifiers in series with each other connected to the DC source and a connection point between which forms the output terminal for the output voltage of the inverter. These rectifiers are fired alternately. Two controlled commutating rectifiers in series are arranged to be supplied with DC voltage and are fired alternately in order to extinguish the main rectifiers. A commutating capacitor is connected between the connection point of the main rectifiers and a point between the commutating rectifiers. An inductive element is connected with the capacitor to form an oscillating circuit so as to recharge the capacitor at each commutation. A series connection including the commutating rectifiers is supplied with positive and negative DC voltage of higher and lower potential respectively than that of the positive and negative poles of the first DC source. A limiting rectifier having such polarity that it is made reverse blocking by the voltage of the first DC source is connected between each pole of the first DC source and the terminal of the commutating capacitor facing the AC output.

2. The Prior Art

Such inverters are previously known and one such example is shown in FIG. 1. A capacitor C1 is connected over the supply direct voltage U2. T13 and T23 are main thyristors, T11 and T21 commutating thyristors and D11 and D21 feed-back and commutating diodes. The function is the following: T13 is assumed to be conducting and carrying the load current I (the load is connected to the output a). The capacitor C is then charged with positive potential on the righthand plate. T11 ignites, C discharges through T13, T11 and L. The capacitor current increases until it is equal to the load current, whereupon T13 shuts off and D11 begins to carry current. The capacitor is recharged through D11, T11 and L and when its voltage has reached peak value (positive potential to the left), T11 is extinguished. If there is any reactive load current component, it will flow through D21 during the last part of the commutating process.

When the commutation is complete, the second main thyristor T23 can ignite.

However, this coupling has several drawbacks. It has been found that the commutation oscillating circuit (L, C) is supplied with energy by the load current so that, with high load current, the capacitor voltage may assume extremely high values which are only limited upwardly by the losses of the oscillating circuit. This means that, particularly with inverters for high voltages, there are extremely high voltage stresses on the thyristors and also that a very substantially dimensioned capacitor is required from the voltage point of view.

The capacitor voltage will also be dependent on the supply voltage U2, and therefore with an inverter having variable supply voltage, this cannot be decreased below a certain limit determined by the requirement of sufficient commutating energy.

The reverse blocking voltage across the main thyristors during their recovery time will furthermore not be greater than the voltage drop over the diodes D11, D21, that is only around one volt or so. The recovery time, that is the length of time from when the load current ceases through a thyristor until it can once again take up a voltage in the conducting direction, is strongly dependent on the magnitude of the reverse blocking voltage during this interval, and it will therefore be long in the known coupling. Certain devices are known to eliminate this drawback, but they are either complicated, require considerable power or are not very efficient.

SUMMARY OF THE INVENTION

These disadvantages are eliminated with an inverter according to the invention.

An inverter having a connection group arranged to be fed with DC voltage and which includes two controlled main rectifiers in series with each other connected to the DC source.

BRIEF DESCRIPTION OF THE DRAWINGS

The invention will be further described in connection with the accompanying drawings.

DESCRIPTION OF THE PREFERRED EMBODIMENTS

Figure 1:
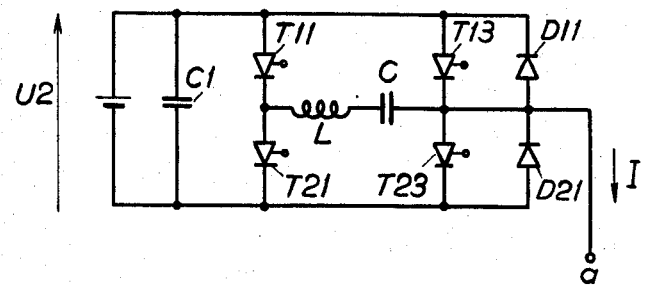
FIG. 1 shows a previously known inverter as described above.
Figure 2:
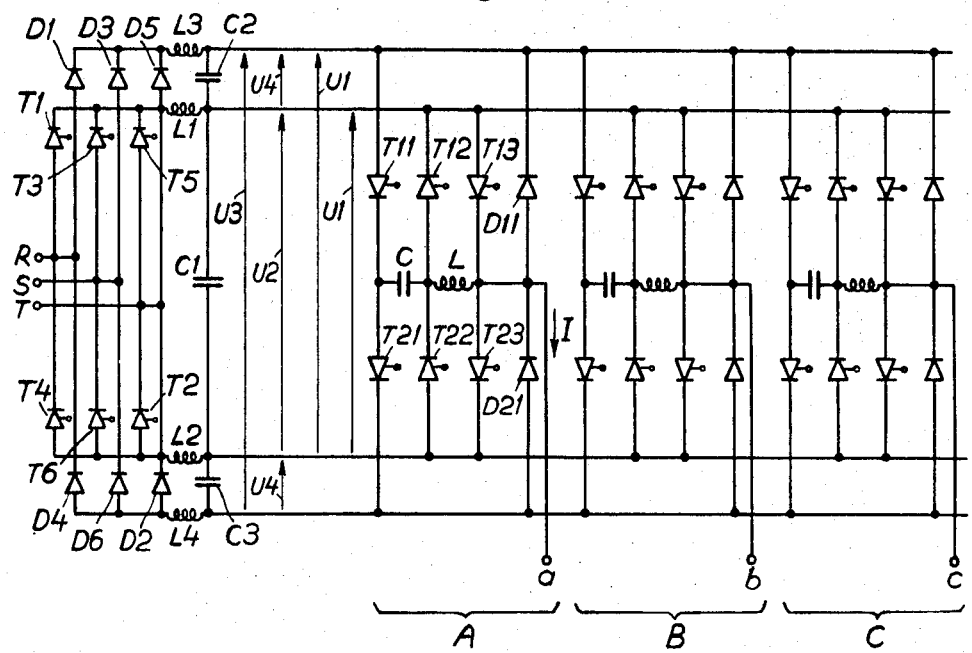
FIG. 2 shows a three-phase inverter according to the invention, fed from a controlled converter.

In FIG. 2 the thyristors T1 - T6 form a controlled, three-phase converter which is connected to a three-phase network R, S, T. The thyristors are phase-angle controlled in known manner by a conventional device, not shown, by means of which the direct voltage of the converter can be varied. This voltage is smoothed by the reactors L1 and L2 and the capacitor C1 and the voltage across the capacitor, designated U2, is supplied to the inverter itself. The diodes D1 – D6 form a rectifier bridge which is connected to the same alternating voltage network R, S, T. The direct voltage of the bridge is smoothed by the reactors L3 and L4 in cooperation with the capacitors C1 – C3 and the voltage across the three capacitors is designated U3. It is important that U2 is always at least a few volts, preferably some tens of volts, less than U3. It is thus suitable to provide the control device of the controlled converter with a limitation so that its control angle can never become less than a value suitable for this purpose. U1 is the voltage across the capacitor C1 and one of the capacitors C2 and C3, while U4 is the voltage across one of the capacitors C2 and C3.

The inverter itself consists of three identical phase groups A, B and C, each provided with an alternating voltage output terminal (a, b, c). A conventional control device, not shown for the sake of clarity, is arranged to ignite the main thyristors T13 and T23 in each phase group alternately (with 180° delay) with a certain frequency in known manner. The alternating voltage output terminal of each phase is connected alternately to the positive and negative poles of the supply voltage U2. The phase groups A, B, C are controlled in known manner with 120° phase displacement, so that the square alternating voltages at the terminals a, b, c will be mutually phase shifted 120° and form a symmetrical three phase system. Since the three phase groups operate in exactly the same manner, only one group A is described.

It comprises the main thyristors T13 and T23, which are connected to the supply voltage. A commutating circuit is arranged to extinguish the conducting main thyristor prior to ignition of the other main thyristor, said circuit comprising the commutating thyristors T11 and T21 connected to the auxiliary voltage U3, the commutating capacitor C and the commutating reactor L. Furthermore, the limitation thyristors T12 and T22, having opposite conducting direction to said thyristors T11 and T21, are connected between the connection point between L and C and the two poles of the supply voltage, and the commutation diodes D11 and D21 between the alternating voltage output and the two poles of the auxiliary voltage.

The operation is as follows:

T13 is assumed to be conducting, whereupon the load current I flows from the supply voltage source through T13 and out through the alternating voltage output a. The capacitor C is charged with positive potential on the right plate. T11, D12, T21 and D22 are not conducting. The control device gives an ignition pulse to T11 and T22. An increasing current starts to flow through T11, C and L. When this current has increased to the same value as the load current, the current through T13 becomes zero and D11 starts to carry current. The main thyristor thus receives a reverse blocking voltage equal to U4 during its recovery interval. The oscillation circuit C, L continues to oscillate around through D11 and T11 until the capacitor voltage becomes equal to U1, whereupon T11 is extinguished and T22 starts to carry current. If there is an inductive load, the load current may continue to flow through T22 and L, energy thus being fed back to the supply source. At a suitable moment, preferably when the current through T22 and L has dropped to zero, the control device gives an ignition pulse to T23 and the commutation process is completed.

As is seen, a capacitor voltage is always obtained which is equal to $U1 = (U3 + U2/2)$ and by making U3 sufficiently large it can be ensured that, even with low values for the supply voltage U2, there is sufficient capacitor charge to extinguish the greatest load current occurring. Furthermore, this eliminates the above-mentioned problems of a capacitor voltage growing sharply with the load current. Since both the commutation thyristors T11, T21 and the commutation diodes D11, D21 are connected to the auxiliary voltage source, during normal load no energy derived from the auxiliary voltage source is supplied to the main voltage source upon commutation through the commutation circuit, which might otherwise, with low load current, require energy from the latter to be fed back to the alternating current network, which would mean having an extra converter. Since the limiting thyristors T12, T22 are connected to the main voltage source, even with inductive load no energy need be fed back to the auxiliary voltage source, which would also have given rise to the same problem.

If, as indicated above, T22 receives an ignition impulse at the same time as T 11, this ignition impulse must of course be long enough for T22 to receive voltage in the forward blocking direction before the end of the ignition impulse. Alternatively of course T22 can be given a short ignition impulse at the same time that, or slightly after, it has received forward blocking voltage.

Figure 3:
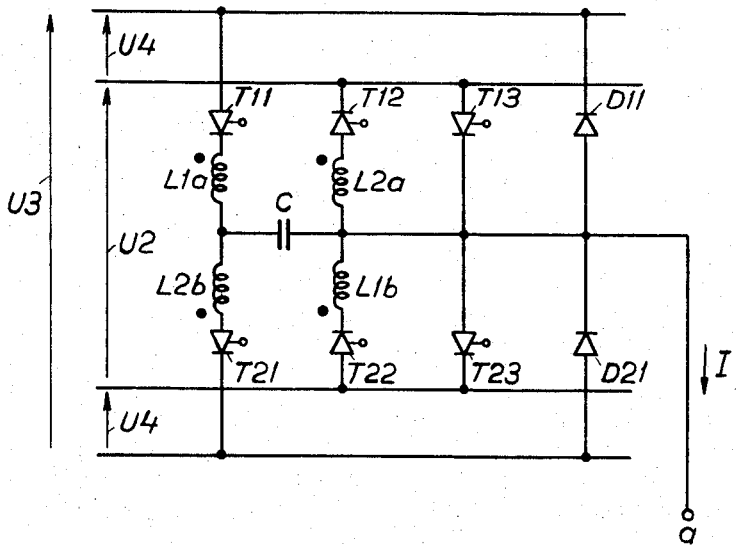
FIG. 3 shows an alternative embodiment of a phase group.

FIG. 3 shows another embodiment of a phase group in an inverter according to the invention. The rectifiers and their connection are exactly the same as those shown in FIG. 2. The commutation reactor L is divided into two reactors L1 and L2, each having two windings connected inductively to each other. L1 has windings L1a, connected in series with T11 and L1b connected with T22 and L2 has windings L2a, in series with T12 and L2 in series with T21. The directions of the voltages induced simultaneously in the two windings of a reactor are indicated by the marks beside the windings. The coupling between the two windings in each reactor is performed as well as possible.

The function of the coupling is almost the same as that described above. If T13 is conducting and T11 ignites, L1a and C will form an oscillation circuit which recharges C until, with positive potential on the lefthand plate, it receives the voltage U1, whereupon T22 starts to carry current. Since L1a and L1b are well coupled together, L1b and T22 can immediately take over the current flowing through L1a and T11. The difference in comparison with the coupling shown in FIG. 2 is that T11 can be ignited and a commutation process initiated even if the load current flows through T12. The inductance in the circuit T11, L1a, L2a, T12 prevents the capacitor C from being instantaneously discharged through this circuit and, as is desired, the capacitor current will mostly be available to extinguish T13. This means that this inverter coupling can be used with arbitrary phase angle of the load, both inductive and capacitive. The coupling shown in FIG. 2, on the other hand, is preferably only suitable for inductive and resistive load.

In FIG. 3 there are two entirely separate reactors. One, L1, has two windings, L1a and L1b. The other reactor, L2, has two windings, L2a and L2b (see page 6, third paragraph). The windings are so wound that the sign of the voltage induced is the same at the dotted ends of the windings, that is, at a positive voltage upwards in winding L1a, there is also a positive voltage downwards in L1b. The sum of the currents flowing into the dotted ends of the two windings will therefore tend to be constant and cannot change instantaneously. However, the distribution of current between the windings can change instantaneously. All this is well known from elementary circuit theory.

FIG. 3 functions essentially as follows: Assume T 13 is conducting. The load current will then have the direction shown. C will be charged positive on the right plate. When commutation is desired, a firing pulse is given to T 11 and T 22 (the latter pulse should be long, see page 6, paragraph 2). An increasing current will flow through T 11, L1a, C. Assuming a constant load current, the current through T 13 will decrease at the same rate that the T 11, L1a, C current increases. When the T 13 current is zero, T 13 is extinguished. The T 11, L1a, C current continues then through D 11. When the C voltage becomes U1 (negative on the right plate), T 22 starts conducting and T 11 stops conducting, that is, the current is instantaneously transferred from L1a to L1b. The voltage of C is thus always limited to U1.

The current transferred to L1b will continue to flow from the main source negative terminal through T 22 and L1b. If the load is inductive, this current will also be the load current, and the inductive energy of L1 and the load will be fed back to the main source. If the load is resistive or very low, some or all of the L1 current will flow through D11 to the auxiliary source positive pole. As this energy originally derives from the auxiliary source, this will not cause a voltage build-up of this source, as some of this energy will have been lost through resistive losses.

As is usual in circuits of this type, the natural frequency of the circuit L1 − C or L2 − C is considerably higher than the working frequency of the inverter. Also, L1 is identical to L2. Winding L1a should also be identical to windings L1b as to number of turns and L2a to L2b.

Figure 4:
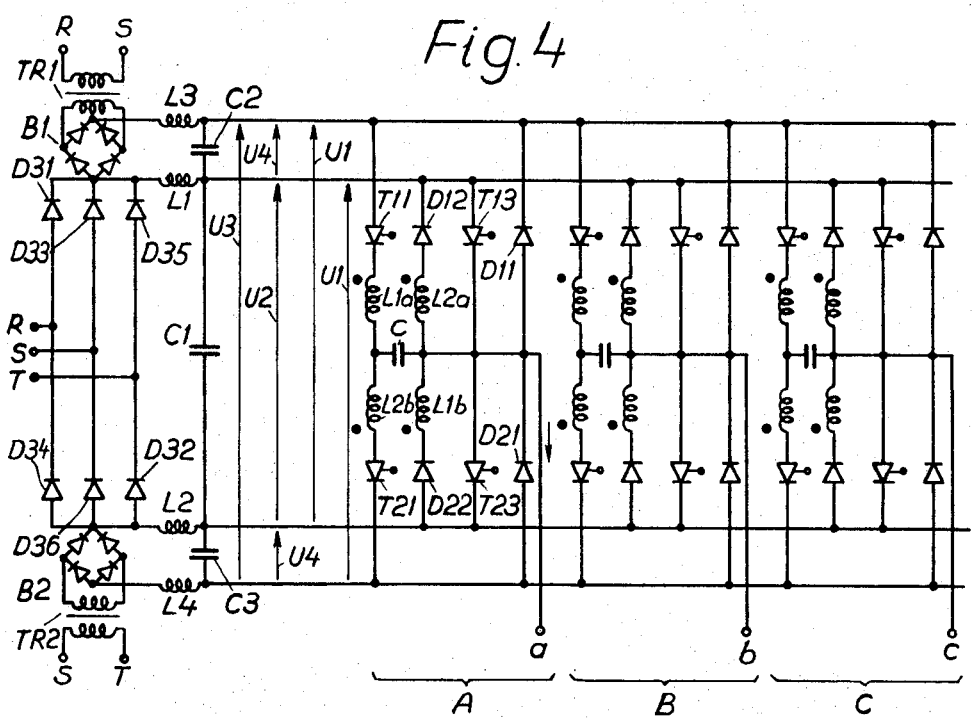
FIG. 4 shows a three-phase inverter according to another embodiment of the invention, fed from an uncontrolled converter.

FIG. 4 shows another embodiment of the invention. An uncontrolled three-phase bridge having diodes D31 − D36 is connected to the alternating current network R, S, T and comprises the main supply source, its voltage being smoothed by L, L2, C1. Between two phases of the network, for example, or alternatively to extra windings on a converter-transformer if there is one, the transformers TR1 and TR2 are connected. These feed the diode bridges B1 and B2 whose voltages are smoothed by L3, C2, L1 and L2, C3, L4, respectively. The voltages across C2 and C3 are arranged to be equally large and are designated U4 as previously. U4 should be as low as possible in comparison with U2 and is chosen only so high that sufficiently short recovery time is obtained for the main thyristors T13, T23, for example 30–50 V.

In comparison with the coupling shown in FIG. 3 the difference in each phase group is only that the limiting thyristors T12 and T22 have been replaced by the diodes D12 and D22, thus making the construction less expensive. The diodes D12, D22 have exactly the same function as described above for the limiting thyristors, i.e. to limit the capacitor voltage to $U1 = U2 + U4$ and to carry reactive current. When the commutating thyristor T11 ignites to extinguish T13, a certain current, limited by L2a, flows through L2a and D12 to the main voltage source. This was not the case in the coupling according to FIG. 3, since the thyristor T12 was not ignited during this interval. Since U4 in this embodiment is constant and low, however, this current can be kept so low that it does not cause any drawbacks.

In FIG. 4 the function is essentially the same as in FIG. 3. When the C voltages become equal to U1 (negative right plate) D 22 starts conducting and the L1 current is momentarily transferred from L1a to L1b. During the interval after T 13 stops conducting, voltage U 4 is placed across L2a − D12, causing some current to flow to the main source. This is the only significant difference between FIG. 3 and FIG. 4.

Of course a great number of combinations of various controlled and uncontrolled direct voltage sources can be used instead of the circuits shown to generate main direct voltage and auxiliary direct voltage. A common requirement for these, however, is that U4 shall be positive and always have sufficient value to obtain a rapid recovery of the main thyristors. Furthermore, the voltage U1, to which the commutation capacitor voltage is tied, must always be sufficient to ensure extinction of the load current. If however, this drops with the supply voltage (U2), for example, U1 may of course also be permitted to drop with U2, but never below a value sufficient for commutation at no-load.

The inverters shown are three-phase. However, phase groups in accordance with the invention may of course be combined to inverter connections with arbitrary phase number. Two such groups may thus be combined to form a single phase inverter.

The control device has not been described in detail, but may be constructed in a great number of known ways or ways obvious to one skilled in the art. Thus, for example, an oscillator may be arranged to trigger a ring counter or the like with six stable positions (for a three-phase connection), which distributes the ignition pulses to the six main thyristors of the inverter. Possibly the commutating thyristors may be ignited from the ring counter and delay circuits be arranged between each commutating thyristor (for example T11) and the main thyristor (T23), which is to carry current after the commutation in such a way that each main thyristor is ignited a certain time after the corresponding commutating thyristor (T11). By making the control pulse frequency variable, variable frequency is obtained in the output voltage of the inverter and it can then be used, for example, to control the speed of an asynchronous motor. Of course the amplitude of the alternating voltage can be controlled in known manner, dependent on or irrespective of the frequency, by varying the supply direct voltage U2, for example in the coupling according to FIG. 2, by controlling the direct voltage of the converters (T1 − T6) by phase angle control.

The commutating diodes (D11 and D21) may possibly be omitted. However, in this case, there is no automatic protection against feed-back of energy from the auxiliary to the main voltage source. In, for example, cases where the main voltage source can accept fed-back energy or where the inverter always operates with relatively high load current, however, this is of no consequence or at least the slight disadvantage is outweighed by the simplification brought about by omission of the diodes.

It may also in certain cases be suitable to distribute the necessary circuit inductance over a reactor (L in FIG. 2) in series with the commutating capacitor and also coupled reactors (L1 and L2 in FIG. 4) having windings in series with the commutating thyristors (T11 and T21) and the limiting rectifiers (T12, T22 and D12, D22, respectively).

I claim:

1. Inverter comprising at least one connection group which is connected to and arranged to be fed from a first DC source, each connection group comprising
   a. two controlled main rectifiers, in series with each other, connected between the two poles of the first DC source, their connection point forming the output terminal for the output voltage of the inverter, and means to fire these rectifiers alternately, b. two controlled commutating rectifiers connected in series with each other to fire the commutating rectifiers alternately in order to extinguish the main rectifiers, c. a commutating capacitor connected between the connection point of the main rectifiers and a point in said series connection situated between the commutating rectifiers, d. means including at least one inductive element forming with the commutating capacitor a series oscillating circuit to recharge the capacitor at each commutation, in which is provided, e. a second DC source between the poles of which said series connection including the commutating rectifiers is connected, the positive and negative poles of this second DC source having higher and lower potential, respectively, than the positive and negative poles of the first DC source, f. a limiting rectifier connected between each pole of the first DC source and the terminal of the commutating capacitor facing the AC output, said limiting rectifier having such polarity that it is made reverse blocking by the voltage of the first DC source, g. the inductive element comprising two reactors, each reactor having two coils connected together inductively, each reactor having one winding connected in series with the commutating rectifier connected to the second DC source pole having one polarity and the other winding in series with the limiting rectifier connected to the pole of said first DC source of the other polarity.

2. Inverter according to claim 1, in which the inductive element comprises a reactor connected between the connection point of the main rectifiers and the connection point of the limiting rectifiers and the limiting rectifiers comprise controlled rectifiers, means operable when a commutating rectifier connected to direct voltage of a certain polarity fires, at least during a part of the commutation process, to keep the limiting rectifier connected to direct voltage of the other polarity conducting.

* * * * *